(12) United States Patent
Schwarz et al.

(10) Patent No.: US 11,016,181 B2
(45) Date of Patent: May 25, 2021

(54) LIDAR SCANNING DEVICE ON A MOTOR VEHICLE

(71) Applicant: Robert Bosch GmbH, Stuttgart (DE)

(72) Inventors: Hans-Jochen Schwarz, Stuttgart (DE); Jan Sparbert, Rutesheim (DE); Joern Ostrinsky, Ditzingen (DE); Klaus Stoppel, Mundelsheim (DE); Rene Adams, Nuertingen (DE); Mustafa Kamil, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 389 days.

(21) Appl. No.: 16/063,912

(22) PCT Filed: Nov. 7, 2016

(86) PCT No.: PCT/EP2016/076834
§ 371 (c)(1),
(2) Date: Jun. 19, 2018

(87) PCT Pub. No.: WO2017/108247
PCT Pub. Date: Jun. 29, 2017

(65) Prior Publication Data
US 2019/0011538 A1   Jan. 10, 2019

(30) Foreign Application Priority Data

Dec. 22, 2015   (DE) ............... 10 2015 226 502.1

(51) Int. Cl.
*G01S 7/48* (2006.01)
*G01S 7/481* (2006.01)
(Continued)

(52) U.S. Cl.
CPC .......... *G01S 7/4817* (2013.01); *G01S 7/4972* (2013.01); *G01S 17/42* (2013.01); *G01S 17/931* (2020.01);
(Continued)

(58) Field of Classification Search
USPC ............................................. 356/4.01, 5.01
See application file for complete search history.

(56) References Cited

U.S. PATENT DOCUMENTS 5,442,358 A * 8/1995 Keeler ..................... B63G 7/00
                                                342/54
5,694,130 A * 12/1997 Suzuki .................. G01S 13/931
                                                342/70
(Continued)

FOREIGN PATENT DOCUMENTS

CO   2005043201 A   2/2005
DE     10349755 B3   1/2005
(Continued)

OTHER PUBLICATIONS

English Translation of DE 10349755 (Year: 2005).*
International Search Report for PCT/EP2016/076834, dated Feb. 28, 2017.

*Primary Examiner* — James R Hulka
(74) *Attorney, Agent, or Firm* — Norton Rose Fulbright US LLP; Gerard Messina

(57) ABSTRACT

A lidar scanning device for use in a motor vehicle includes a lidar sensor having a predefined scanning field, the lidar sensor being configured for determining the distance of an object within the scanning field, and a pivot device for varying an alignment of the scanning field of the lidar sensor as a function of a driving direction of the motor vehicle.

8 Claims, 5 Drawing Sheets

(51) Int. Cl.
  *G01S 7/497* (2006.01)
  *G01S 17/42* (2006.01)
  *G01S 17/931* (2020.01)
  *G01S 13/931* (2020.01)
  *G05D 1/02* (2020.01)

(52) U.S. Cl.
  CPC ............... *G01S 2013/932* (2020.01); *G01S 2013/93271* (2020.01); *G01S 2013/93273* (2020.01); *G01S 2013/93274* (2020.01); *G01S 2013/93275* (2020.01); *G05D 1/0231* (2013.01); *G05D 2201/0213* (2013.01)

(56) References Cited

U.S. PATENT DOCUMENTS

| | | | | |
|---|---|---|---|---|
| 5,767,803 | A * | 6/1998 | Yamada | G01S 13/931 342/69 |
| 6,067,038 | A * | 5/2000 | Uehara | G01S 13/584 342/70 |
| 6,119,067 | A * | 9/2000 | Kikuchi | G01S 7/4026 342/158 |
| 6,209,909 | B1 * | 4/2001 | Breed | B60R 22/321 280/735 |
| 6,343,810 | B1 * | 2/2002 | Breed | B60R 22/321 280/730.2 |
| 6,480,102 | B1 * | 11/2002 | Miller | G08G 1/161 342/70 |
| 6,522,287 | B1 | 2/2003 | Stopczynski | |
| 6,674,394 | B1 * | 1/2004 | Zoratti | B60T 7/16 342/70 |
| 9,387,938 | B1 * | 7/2016 | Vanderkamp | G01S 13/935 |
| 2002/0147534 | A1 * | 10/2002 | Delcheccolo | H01Q 1/38 701/45 |
| 2011/0255070 | A1 * | 10/2011 | Phillips | G02B 5/09 356/4.01 |
| 2014/0111812 | A1 * | 4/2014 | Baeg | G01S 7/4814 356/610 |
| 2016/0266246 | A1 * | 9/2016 | Hjelmstad | G01S 15/86 |
| 2016/0288833 | A1 * | 10/2016 | Heimberger | G08G 1/168 |
| 2018/0275249 | A1 * | 9/2018 | Campbell | G01S 17/42 |

FOREIGN PATENT DOCUMENTS

| | | |
|---|---|---|
| EP | 2148220 A1 | 1/2010 |
| JP | H07244162 A | 9/1995 |
| JP | H10147197 A | 6/1998 |
| JP | 2007225342 A | 9/2007 |
| JP | 2014004904 A | 1/2014 |
| WO | 2016198522 A1 | 12/2016 |

\* cited by examiner

LIDAR SCANNING DEVICE ON A MOTOR VEHICLE

FIELD OF THE INVENTION

The present invention relates to a lidar scanning device on a motor vehicle. In particular, the present invention relates to the control of the lidar scanning device.

BACKGROUND INFORMATION

A lidar scanning device is mounted on a motor vehicle. The scanning device emits light into an environment and receives light that was reflected at an object. A distance to the object is then able to be determined on the basis of a propagation time of the light. In different specific embodiments, the light beam of the scanning device is able to be cyclically moved in one or two direction(s) in order to scan a predefined scanning field. For instance, a collision warning system is capable of evaluating the scanning results of the scanning device in order to determine whether the vehicle is coming closer to an object so that a collision risk exists. Lidar scanning devices are currently not widely used and are generally allocated to a particular function on board the motor vehicle. As a result, the alignment of a lidar scanning device on the vehicle is usually rigid.

SUMMARY OF THE INVENTION

The present invention is based on the objective of providing a technique for a more flexible utilization of a lidar scanning device on a motor vehicle. The present invention achieves this objective by the subject matters of the descriptions herein. The further descriptions herein concern further exemplary embodiments.

A lidar scanning device for use in a motor vehicle includes a lidar sensor that has a predefined scanning field, the lidar sensor being configured for determining the distance of an object within the scanning field; in addition, it has a pivot device for varying an alignment of the scanning field of the lidar sensor as a function of a driving situation of the motor vehicle.

The variability of the alignment of the scanning field makes it possible to utilize the scanning device in a more flexible manner. For example, different driver assistants that are used in different driving situations may access the lidar scanning device and in the process align the scanning field in an improved manner as a function of their respective tasks. For instance, a driver assistant meant to determine a collision warning pertaining to a motor vehicle driving ahead may require a different alignment of the scanning field than a parking assistant intended for scanning a near region of the motor vehicle for obstacles.

In a first variant, the pivot device is configured to pivot the lidar sensor about an axis. The entire lidar sensor, which may include automatically moving parts, is placed so as to be pivotable. The pivot device may have a simple and robust design.

In another variant, the pivot device is configured to pivot a reflective or refractive element in the optical path of the lidar sensor about an axis. The reflective element may include a mirror, for instance, or the refractive element may include a prism. A moved mass to be moved by the pivot device may therefore be reduced. An electrical contacting of the lidar sensor may be simplified since the electrical connections need not bridge the pivot axis.

In one specific embodiment, the alignment of the scanning field is varied as a function of the driving speed of the motor vehicle. At a low driving speed, in particular, the scanning field may be varied in the direction of the ground, and at a high driving speed, it may be varied in the direction of the horizon. A maximum distance of an object that is able to be scanned with the aid of the scanning device may thus be greater at a high speed than at a low speed of the motor vehicle.

In different specific embodiments, the scanning field may be pivoted about a transverse axis or a vertical axis of the motor vehicle. In one particular embodiment, the alignment of the scanning field is able to be varied in both directions. This makes it possible to achieve a maximum flexibility with regard to the usability of the lidar scanning device for different measuring tasks or for improving a measuring result of a single measuring task.

The lidar scanning device may be mounted at different locations of the motor vehicle. For example, an affixation in the region of a vehicle roof, a side molding, a radiator grille, or on a bumper is able to take place. However, an affixation of the scanning device on the housing of a side mirror of the vehicle especially may be provided. A region that is relevant for the motor vehicle is able to be dynamically selected and scanned in an improved manner in particular in combination with a pivotability of the scanning field in a horizontal and a vertical direction (about the vertical axis and the transverse axis). In addition, lidar scanning devices may be installed both in a left and in a right side-mirror housing of the motor vehicle. The respectively scanned regions may advantageously overlap or supplement one another.

A method includes steps of determining a driving situation of a motor vehicle; varying an alignment of a scanning field of a lidar sensor of a lidar scanning device that is mounted on the vehicle on the basis of the determined driving situation; scanning an environment of the motor vehicle with the aid of the lidar scanning device; and determining a distance from an object within the scanning field.

The method may especially be used for controlling the lidar scanning device described above.

In one specific embodiment, the determined distance to the object is output. In another specific embodiment, the motor vehicle is controlled as a function of the determined distance. For instance, the scanning device may be used for determining an uneven ground surface in front of the motor vehicle, and a chassis of the motor vehicle is able to be adapted to the determination result. For example, if corrugations in the road surface or pot holes are present, then a damping of the chassis may be selectively adjusted in the direction of hard or soft.

The present invention will now be described in greater detail with reference to the appended figures.

DETAILED DESCRIPTION

Figure 1:
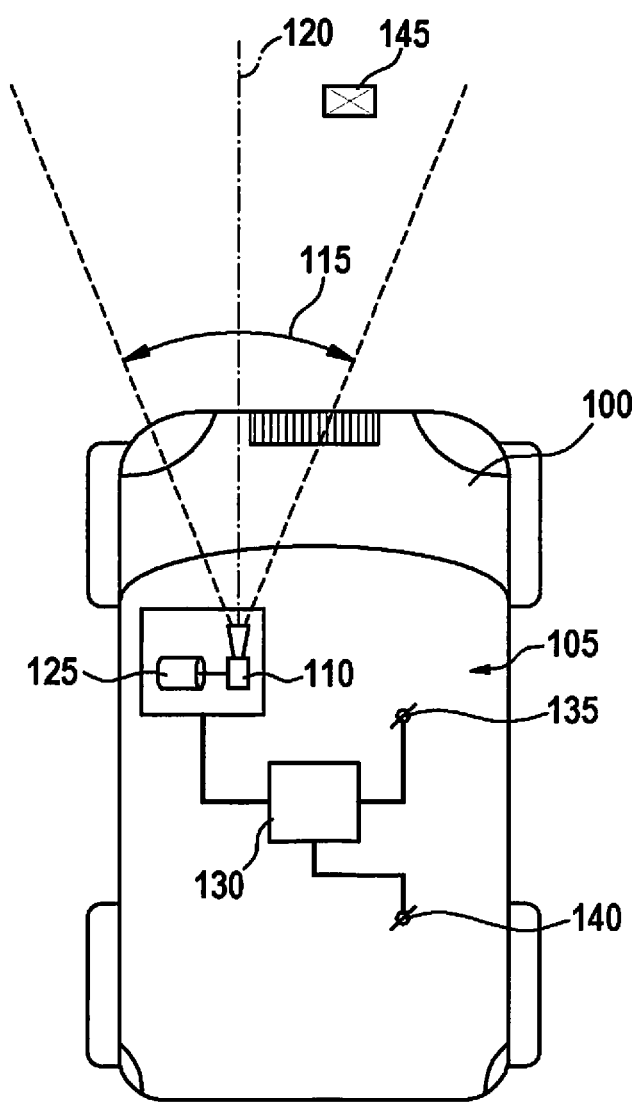
FIG. 1 shows a motor vehicle having a lidar scanning device.

FIG. 1 shows a motor vehicle 100 having a lidar scanning device 105. Scanning device 105 includes a lidar sensor 110, which has a predefined scanning field 115 having a predefined alignment 120, and an adjustment device 125. A control device 130 for the control of adjustment device 125 and/or lidar sensor 110 may be provided in addition. Control device 130 may include a first interface 135 for receiving information that points to a driving situation of motor vehicle 100. In addition, a second interface 140 is provided in order to supply a scanning result of lidar sensor 110 in raw or processed form. In different specific embodiments, second interface 140 may be connected to a display device, a warning device, or a further processing device which carries out a driver-assistance function for motor vehicle 100.

Lidar sensor 110 emits light and receives emitted light that was reflected at an object 145 in scanning field 115. As will still be explained in greater detail below with reference to FIG. 2, scanning field 115 may be restricted by an angle in one or two dimension(s). The center of scanning field 115 is formed by alignment 120. Alignment 120 is shown as a beam that halves both angles, in particular a horizontal and a vertical angle in each case. As a rule, lidar sensor 110 includes a motoric element for the periodic control of the illumination of scanning field 115. However, alignment 120 is maintained at all times.

It is provided to construct lidar sensor 110 including adjustment device 125 in such a way that alignment 120 of scanning field 115 is able to be varied. In particular, alignment 120 is to be varied as a function of a driving situation of motor vehicle 100. The driving situation may be determined on the basis of a scanning result of lidar sensor 110 and/or on the basis of other scanning or processing operations.

Figure 2:
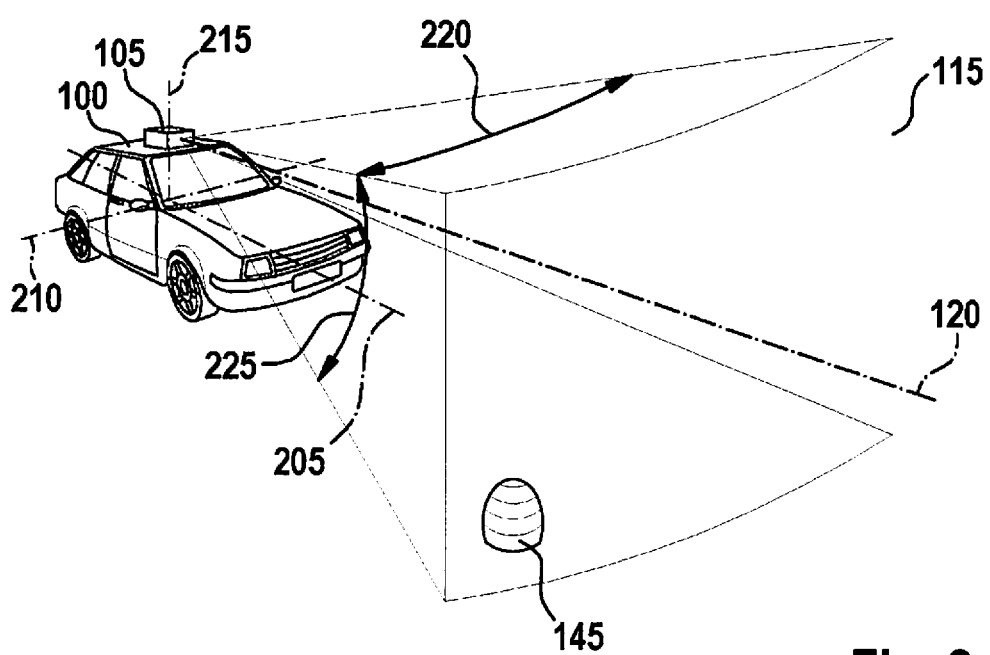
FIG. 2 shows the lidar scanning device from FIG. 1 on a motor vehicle.

FIG. 2 shows lidar scanning device 105 from FIG. 1 on motor vehicle 100 from a different perspective. Merely by way of example, scanning device 105 is mounted on the roof of motor vehicle 100. Motor vehicle 100 has a longitudinal axis 205, a transverse axis 210, and a vertical axis 215. Scanning region 115 of scanning device 105 may be characterized by two angles. A first angle 220 about vertical axis 215 is also referred to as a horizontal angle, and a second angle 225 about transverse axis 210 is also referred to as a vertical angle. Alignment 120 halves both first angle 220 and second angle 225. Object 145 is able to be detected with the aid of lidar scanning device 105 only if is lies within scanning field 15. A distance restriction is not taken into account in this context.

For different purposes, it is useful to scan different scanning fields 115 relative to coordinate system 205, 210, 215 of motor vehicle 100. To do so, lidar sensor 110 of lidar scanning device 105 is configured to be adjusted with the aid of adjustment device 125, i.e. which may be about transverse axis 210, about vertical axis 215, or about both axes 210, 215.

Figure 3A:
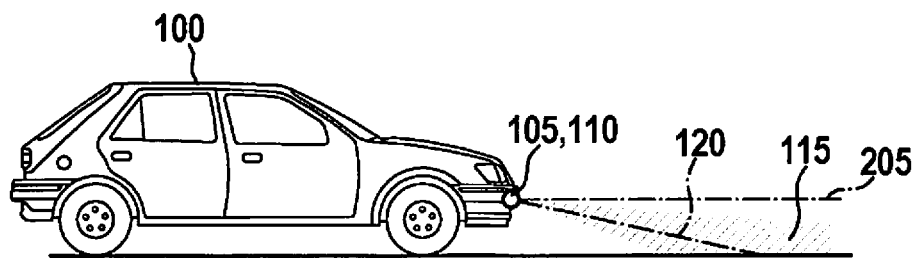
FIG. 3 shows differently horizontally pivoted lidar sensors on a motor vehicle.
Figure 3B:
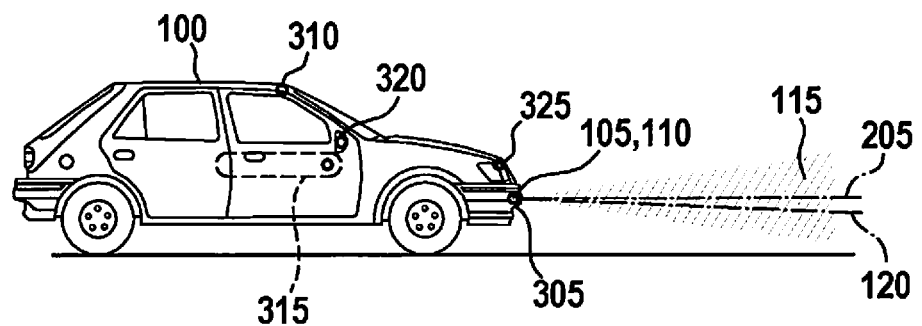

FIG. 3 shows differently vertically pivoted lidar sensors 110 on motor vehicle 100. In FIG. 3A, an angle between longitudinal axis 205 and alignment 120 is relatively large, and scanning field 115 is pivoted in the direction of a subsurface or ground of motor vehicle 100. FIG. 3B shows a position of scanning device 105 in which the same angle is smaller: scanning field 115 is pivoted in the direction of a horizon. In the position of FIG. 3A, a near range of motor vehicle 100 is able to be scanned in a more optimal manner with the aid of lidar scanning device 105, while a far range is better able to be scanned using the position illustrated in FIG. 3B. It may be provided that the large angle from FIG. 3A is adjusted at a low speed, and the small angle from FIG. 3B is adjusted at a high speed of motor vehicle 100. A transition between the angles may be configured to be continuous or abrupt.

In both FIGS. 3A and 3B, lidar sensor 110 is mounted in the frontal region of the motor vehicle, approximately at the level of a bumper 305 of motor vehicle 100. In other specific embodiments, it is also possible, as sketched in FIG. 3B, to use positions in the area of a roof 310, a lateral region 315, a side-mirror housing 320, or a radiator grille 325 for lidar sensor 110. Lidar sensor 110 may be disposed on motor vehicle 100 in such a way that it interferes as little as possible with a longitudinal guidance of motor vehicle 100 and is barely visible or even completely invisible. For instance, lidar sensor 110 may be placed in side region 315 or in a trim strip, on radiator grille 325, or in a brand logo, or on roof 310 or in an antenna housing for a GPS or radio antenna. Especially, there may be an affixation of lidar sensor 110 in side-mirror housing 320.

FIG. 4 shows differently horizontally pivoted lidar sensors 110 on motor vehicle 100. Merely by way of example, two lidar sensors 110 are provided that may belong to the same or to two different lidar scanning device(s) 105. Each lidar sensor 110 is mounted in an exterior mirror housing 320 of motor vehicle 100.

Figure 4A:
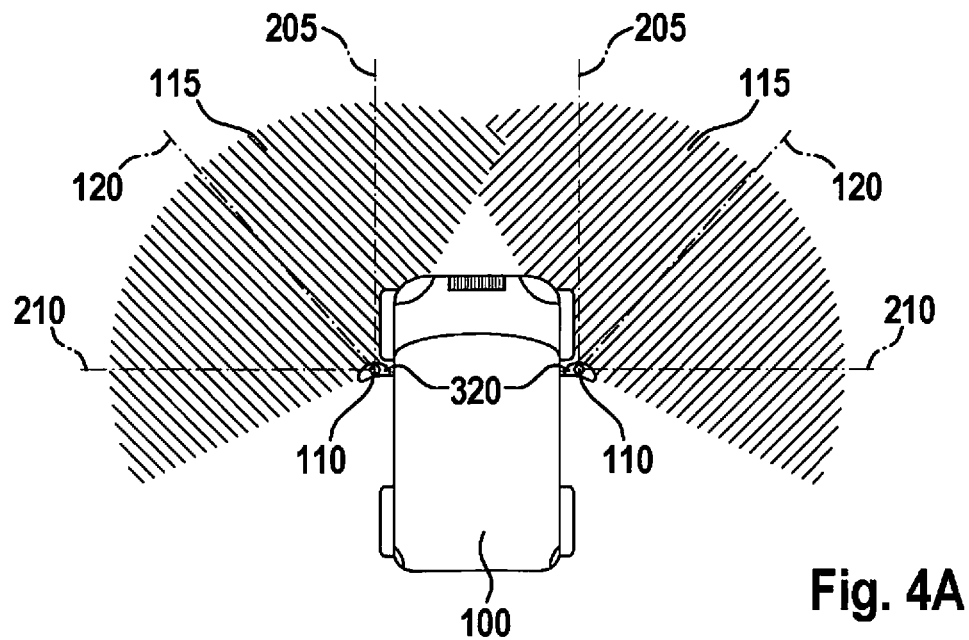
FIG. 4 shows differently vertically pivoted lidar sensors on a motor vehicle.
Figure 4B:
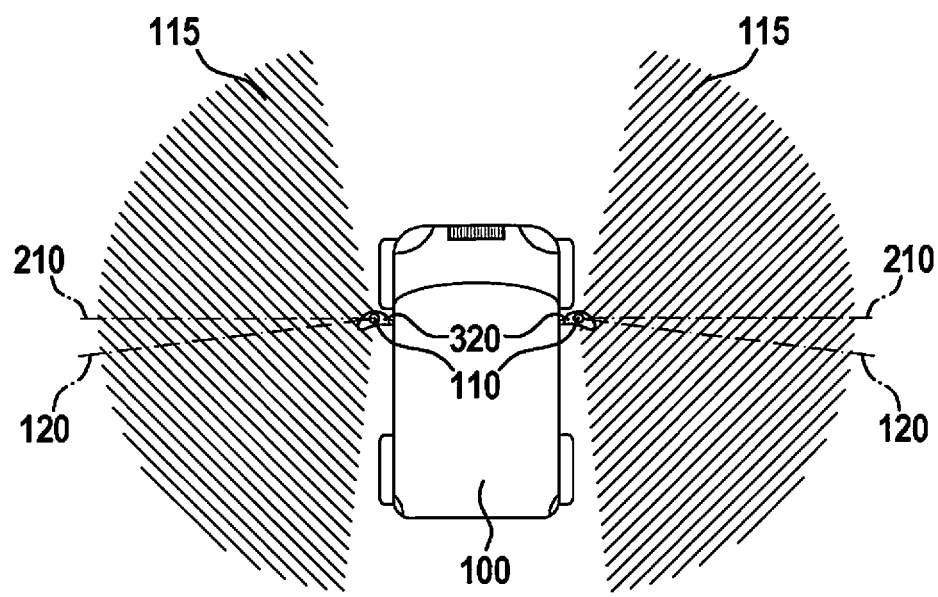

FIG. 4A shows alignments of lidar sensors 110 in which alignments 120 extend in the driving direction of motor vehicle 100 and enclose relatively large angles with respect to transverse axis 210 of motor vehicle 100. Scanning fields 115 of the two lidar sensors 110 overlap in front of motor vehicle 100. FIG. 4B shows a different position of lidar sensors 110 in which alignments 120 exemplarily point slightly counter to the driving direction of motor vehicle 100 and enclose a relatively small angle with respect to transverse axis 210. Scanning fields 115 do not overlap in this instance.

The position shown in FIG. 4B may be used for forward driving, e.g., at a higher speed, while the position shown in FIG. 4B is more optimally assumed during slow driving, when searching for a parking spot, during a parking operation, or in a standstill, for instance.

Figure 5:
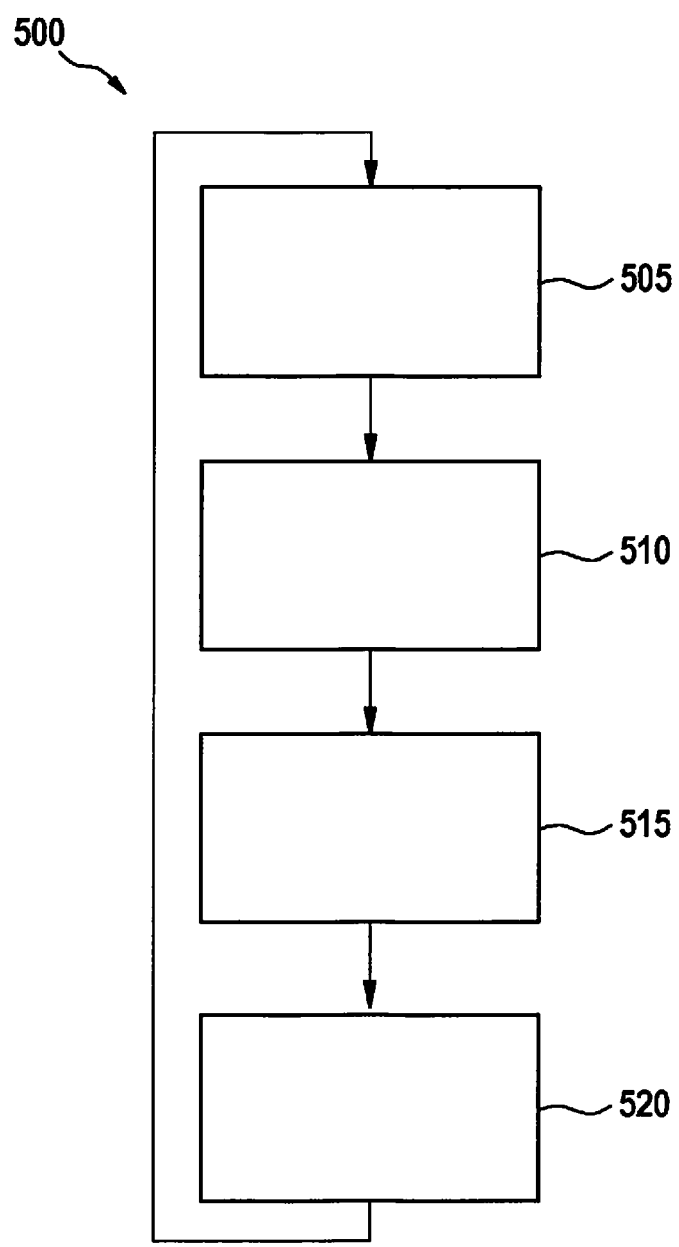
FIG. 5 shows a flow diagram of a method.

FIG. 5 shows a flow diagram of a method 500. Method 500 is particularly configured for an execution in processing device 130. For this purpose, method 500 may include a computer-program product, and processing device 130 may include a programmable microcomputer.

In a first step 505, a driving situation of motor vehicle 100 is determined. For example, the driving situation may be determined on the basis of scanning results in the environment of motor vehicle 100 and/or on the basis of positions of certain actuators. The actuators may pertain to a longitudinal or transverse control of motor vehicle 100, in particular. In addition, a speed, an acceleration or a rotation of motor vehicle 100 along or about axes 205, 210, or 215 may be utilized for determining the driving situation.

In a step 510, alignment 120 of lidar sensor 110 is varied on the basis of the determined driving situation. As already described earlier in the text, an optical system, lidar sensor 110, or complete lidar scanning device 105 may be moved for this purpose. The movement may take place about an axis or, in a further manner, about two axes, which are independent of each other.

In a step 515, an environment of motor vehicle 100 is scanned with the aid of lidar scanning device 105.

In a step 520, a scanning result may be displayed or made available, or motor vehicle 100 may be controlled on the basis of the scanning result. Method 500 may then return to first step 505 and be run through again. It should be noted that the driving situation may also be determined in step 505 on the basis of the scanning result of step 520.

What is claimed is:

1. A lidar scanning device for a motor vehicle, comprising:
a lidar sensor having a predefined scanning field, wherein the lidar sensor is configured for determining the distance of an object within the scanning field; and
a pivot device to vary an alignment of the scanning field of the lidar sensor as a function of a driving situation of the motor vehicle, wherein the alignment extends in a driving direction of the motor vehicle or counter to the driving direction of the motor vehicle, and wherein a center of the scanning field is formed by the alignment, which is maintained at all times for the determined driving situation;
wherein the driving situation is determined based on a scanning result of the lidar sensor and/or based on other scanning operations, and
wherein the scanning field of the scanning device is characterized by two angles, wherein a first angle about a vertical axis of the motor vehicle is a horizontal angle, and a second angle about transverse axis of the motor vehicle is a vertical angle, wherein the alignment halves both the first angle and the second angle, and wherein the object is detectable with the lidar scanning device only if the object lies within the scanning field, and
wherein the scanning field is varied about the transverse axis of the motor vehicle, and the scanning field is varied in the direction of the ground at a low driving speed and in the direction of the horizon at a high driving speed.

2. The lidar scanning device of claim 1, wherein the pivot device is configured to pivot the lidar sensor about an axis.

3. The lidar scanning device of claim 1, wherein the pivot device is configured to pivot a reflective or refractive element in the optical path of the lidar sensor about an axis.

4. The lidar scanning device of claim 1, wherein the alignment of the scanning field is varied as a function of a driving speed of the motor vehicle.

5. The lidar scanning device of claim 1, wherein the alignment of the scanning field is varied about the vertical axis.

6. The lidar scanning device of claim 1, wherein the lidar scanning device is mounted on a side-mirror housing of the motor vehicle.

7. A method to determine a distance from an object within a scanning field of a lidar sensor of a lidar scanning device of a motor vehicle, the method comprising:
determining a driving situation of the motor vehicle;
varying, via a pivot device, an alignment of the scanning field of the lidar sensor of the lidar scanning device that is mounted on the motor vehicle based on the determined driving situation, wherein the alignment extends in a driving direction of the motor vehicle or counter to a driving direction of the motor vehicle, and wherein a center of the scanning field is formed by the alignment, which is maintained at all times for the determined driving situation;
scanning an environment of the motor vehicle with the lidar scanning device; and
determining the distance from the object within the scanning field;
wherein the driving situation is determined based on a scanning result of the lidar sensor and/or based on other scanning operations, and
wherein the scanning field of the scanning device is characterized by two angles, wherein a first angle about a vertical axis of the motor vehicle is a horizontal angle, and a second angle about transverse axis of the motor vehicle is a vertical angle, wherein alignment halves both the first angle and the second angle, and wherein the object is detectable with the lidar scanning device only if the object lies within the scanning field, and
wherein the scanning field is varied about the transverse axis of the motor vehicle, and the scanning field is varied in the direction of the ground at a low driving speed and in the direction of the horizon at a high driving speed.

8. The method of claim 7, wherein the motor vehicle is controlled as a function of the determined distance.

* * * * *